(No Model.)

H. W. BILL.
SCREW TAP.

No. 310,777. Patented Jan. 13, 1885.

Witnesses:

Inventor:
Henry W. Bill,
by O. R. Humphrey
Atty.

UNITED STATES PATENT OFFICE.

HENRY W. BILL, OF CUYAHOGA FALLS, OHIO.

SCREW-TAP.

SPECIFICATION forming part of Letters Patent No. 310,777, dated January 13, 1885.

Application filed August 4, 1884. (No model.)

*To all whom it may concern:*

Be it known that I, HENRY W. BILL, a citizen of the United States, residing at Cuyahoga Falls, in the county of Summit and State of Ohio, have invented a new and useful Improvement in Screw-Taps, of which the following is a specification.

The object of my invention is the construction of a screw-tap provided with a compensating device for taking up wear in the tap itself, and for re-dressing threaded orifices, which, by reason of corrosion or otherwise, must be enlarged and retain the same thread.

Figure 1:
Figure 2:
Figure 3:

My invention consists in the devices illustrated in the accompanying drawings, in which Figure 1 is an elevation of my improved screw-tap with bar removed; Fig. 2, a similar view of the bar, and Fig. 3 an end elevation of tap and bar united.

The tap A differs from those in common use in having one of the threaded faces wider than the others, in which is a longitudinal channel, *a*, substantially rectangular, and extending from the threaded end nearly to the shank. A bar, B, is accurately fitted to this channel, and has its outer face screw-threaded in conformity with the outer face of the tap. When the tap becomes reduced in size by wear, it can be used to cut a threaded orifice of its original size by placing beneath the bar B a thin strip of metal or other material, thereby forcing it beyond the adjacent face of the tap. By the same means it can be used to re-dress screw-threaded orifices in which the thread has become worn or corroded.

I claim—

A screw-tap having in one of its threaded faces a longitudinal channel containing a movable bar fitted to said channel, and with its outer face screw-threaded in conformity with said tap, substantially as shown, and for the purpose specified.

In testimony that I claim the foregoing I have hereunto set my hand this 15th day of July, A. D. 1884.

HENRY W. BILL.

Witnesses:
C. P. HUMPHREY,
E. W. STUART.